United States Patent
Mori et al.

(10) Patent No.: US 11,260,474 B2
(45) Date of Patent: Mar. 1, 2022

(54) MANUFACTURING MACHINE

(71) Applicant: DMG MORI CO., LTD., Yamatokoriyama (JP)

(72) Inventors: Masahiko Mori, Yamatokoriyama (JP); Yuhei Mezawa, Yamatokoriyama (JP); Shigeyuki Takashima, Yamatokoriyama (JP); Shigetsugu Sakai, Yamatokoriyama (JP); Makoto Fujishima, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 769 days.

(21) Appl. No.: 15/559,161

(22) PCT Filed: Mar. 7, 2016

(86) PCT No.: PCT/JP2016/056948
§ 371 (c)(1),
(2) Date: Sep. 18, 2017

(87) PCT Pub. No.: WO2016/152475
PCT Pub. Date: Sep. 29, 2016

(65) Prior Publication Data
US 2018/0065208 A1    Mar. 8, 2018

(30) Foreign Application Priority Data

Mar. 20, 2015 (JP) .............................. JP2015-057181

(51) Int. Cl.
*B23K 26/342* (2014.01)
*B23K 26/00* (2014.01)
(Continued)

(52) U.S. Cl.
CPC ............ *B23K 26/342* (2015.10); *B22F 3/162* (2013.01); *B22F 12/00* (2021.01); *B23B 3/22* (2013.01);
(Continued)

(58) Field of Classification Search
CPC ...... B33Y 10/00; B22F 3/1055; B23K 26/342
See application file for complete search history.

(56) References Cited

U.S. PATENT DOCUMENTS 4,571,814 A * 2/1986 Palfery ................. B23P 19/065
483/14
4,637,121 A * 1/1987 Wortmann ........... B23K 11/318
29/26 A
(Continued)

FOREIGN PATENT DOCUMENTS

JP    2004-314168 A    11/2004
JP    2012-206137 A    10/2012

OTHER PUBLICATIONS

International Search Report dated Apr. 19, 2016, in PCT/JP2016/05694S, filed Mar. 7, 2016.

*Primary Examiner* — Dana Ross
*Assistant Examiner* — Lawrence H Samuels
(74) *Attorney, Agent, or Firm* — Oblon, McClelland, Maier & Neustadt, L.L.P.

(57) ABSTRACT

A manufacturing machine is capable of subtractive manufacturing and additive manufacturing for a workpiece. The manufacturing machine includes: a first headstock and a second headstock disposed in a machining area and configured to hold a workpiece; a tool spindle and a lower tool rest disposed in the machining area and configured to hold a tool to be used for subtractive manufacturing for the workpiece; an additive manufacturing head configured to discharge a material during additive manufacturing for the workpiece; a workpiece gripper configured to grip the workpiece during (Continued)

transportation of the workpiece into and out of the machining area; and a robot arm on which the additive manufacturing head and the workpiece gripper are mountable. Accordingly, the manufacturing machine improving the productivity in the simple and easy manner is provided.

10 Claims, 12 Drawing Sheets

(51) Int. Cl.
| | |
|---|---|
| *B33Y 30/00* | (2015.01) |
| *B23K 26/144* | (2014.01) |
| *B23Q 7/04* | (2006.01) |
| *B29C 67/00* | (2017.01) |
| *B23B 3/22* | (2006.01) |
| *B23P 23/04* | (2006.01) |
| *B25J 15/04* | (2006.01) |
| *B25J 15/00* | (2006.01) |
| *B25J 15/02* | (2006.01) |
| *B29C 64/106* | (2017.01) |
| *B33Y 10/00* | (2015.01) |
| *B22F 3/16* | (2006.01) |
| *C04B 35/64* | (2006.01) |
| *B23Q 3/155* | (2006.01) |
| *B23B 11/00* | (2006.01) |
| *B23Q 3/06* | (2006.01) |
| *B22F 12/00* | (2021.01) |
| *B33Y 40/00* | (2020.01) |
| *B23K 26/08* | (2014.01) |
| *B23K 26/14* | (2014.01) |
| *B22F 10/10* | (2021.01) |

(52) U.S. Cl.
CPC .......... *B23B 11/00* (2013.01); *B23K 26/0093* (2013.01); *B23K 26/0884* (2013.01); *B23K 26/144* (2015.10); *B23K 26/1464* (2013.01); *B23P 23/04* (2013.01); *B23Q 3/065* (2013.01); *B23Q 3/15506* (2013.01); *B23Q 3/15513* (2013.01); *B23Q 7/04* (2013.01); *B25J 15/0019* (2013.01); *B25J 15/0253* (2013.01); *B25J 15/0491* (2013.01); *B29C 64/106* (2017.08); *B29C 67/00* (2013.01); *B33Y 10/00* (2014.12); *B33Y 30/00* (2014.12); *B33Y 40/00* (2014.12); *C04B 35/64* (2013.01); *B22F 10/10* (2021.01); *C04B 2235/6026* (2013.01); *C04B 2235/665* (2013.01); *Y02P 10/25* (2015.11); *Y10T 29/5107* (2015.01); *Y10T 29/5114* (2015.01); *Y10T 483/16* (2015.01); *Y10T 483/17* (2015.01); *Y10T 483/1705* (2015.01)

(56) References Cited

U.S. PATENT DOCUMENTS

| | | | | |
|---|---|---|---|---|
| 4,835,357 | A * | 5/1989 | Schalk | B23K 26/18 219/121.64 |
| 4,845,835 | A * | 7/1989 | Schneider | B25J 9/041 483/49 |
| 4,883,939 | A * | 11/1989 | Sagi | B23K 9/287 219/125.1 |
| 6,664,499 | B1 * | 12/2003 | Brink | B23K 26/032 219/121.67 |
| 7,939,003 | B2 * | 5/2011 | Bonassar | B33Y 30/00 264/308 |
| 8,114,001 | B2 * | 2/2012 | Horn | B25J 9/046 483/15 |
| 9,586,298 | B2 * | 3/2017 | Jones | B23P 15/02 |
| 2004/0133298 | A1 * | 7/2004 | Toyserkani | B23K 26/032 700/166 |
| 2005/0044700 | A1 * | 3/2005 | Ghuman | B62D 65/18 29/791 |
| 2008/0040911 | A1 * | 2/2008 | De Koning | G05B 19/41825 483/1 |
| 2009/0126178 | A1 * | 5/2009 | Kipping | B23P 21/004 29/283 |
| 2010/0176109 | A1 * | 7/2010 | Peters | B23K 9/04 219/137.61 |
| 2010/0204824 | A1 * | 8/2010 | Luce | B25J 11/00 700/219 |
| 2011/0297658 | A1 * | 12/2011 | Peters | B23K 9/02 219/162 |
| 2013/0043219 | A1 * | 2/2013 | Peters | B23K 35/0261 219/72 |
| 2013/0327749 | A1 * | 12/2013 | Denney | B23K 9/0956 219/137 PS |
| 2014/0117586 | A1 * | 5/2014 | Bonassar | B33Y 40/00 264/401 |
| 2014/0286734 | A1 * | 9/2014 | Oda | B25J 9/16 414/222.01 |
| 2014/0319749 | A1 * | 10/2014 | Youngwerth | B23Q 7/043 269/56 |
| 2015/0140230 | A1 * | 5/2015 | Jones | B23P 23/04 427/532 |
| 2015/0183070 | A1 * | 7/2015 | Jones | B23K 26/34 219/76.14 |
| 2015/0239178 | A1 * | 8/2015 | Armstrong | B33Y 30/00 700/98 |
| 2016/0001461 | A1 * | 1/2016 | Gardiner | B25J 11/00 264/219 |
| 2016/0107396 | A1 * | 4/2016 | Berman | B28B 1/00 29/428 |
| 2016/0263706 | A1 * | 9/2016 | Potocki | B23K 26/361 |

\* cited by examiner

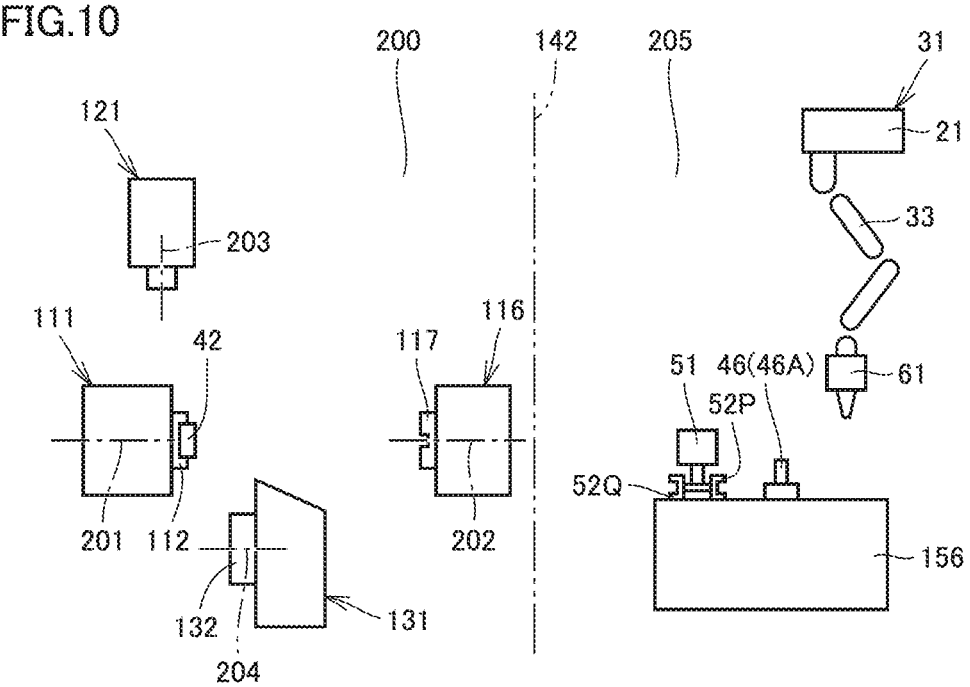
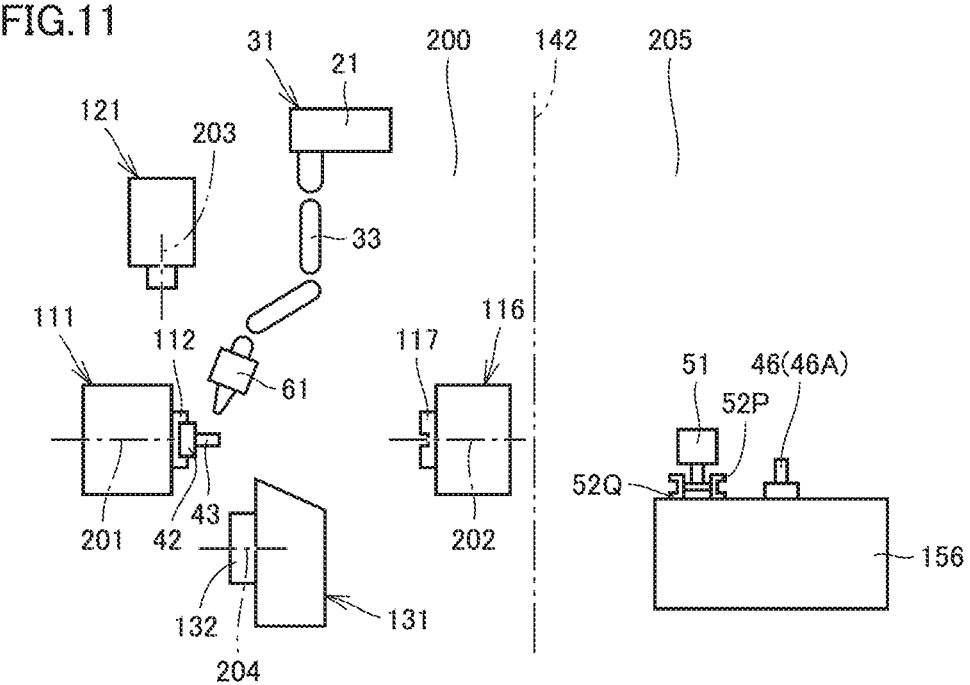

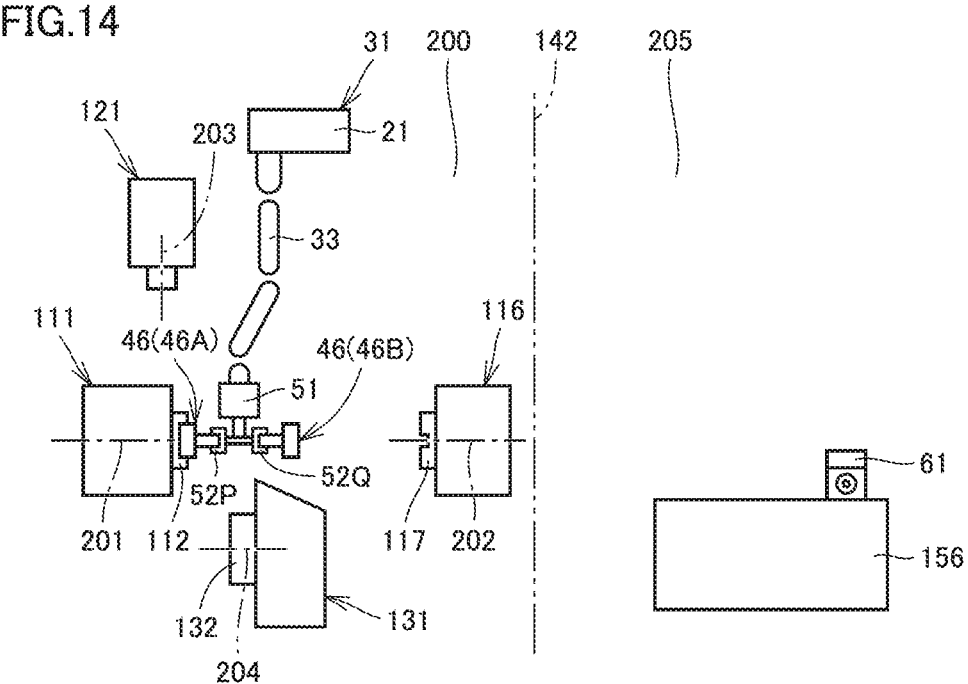
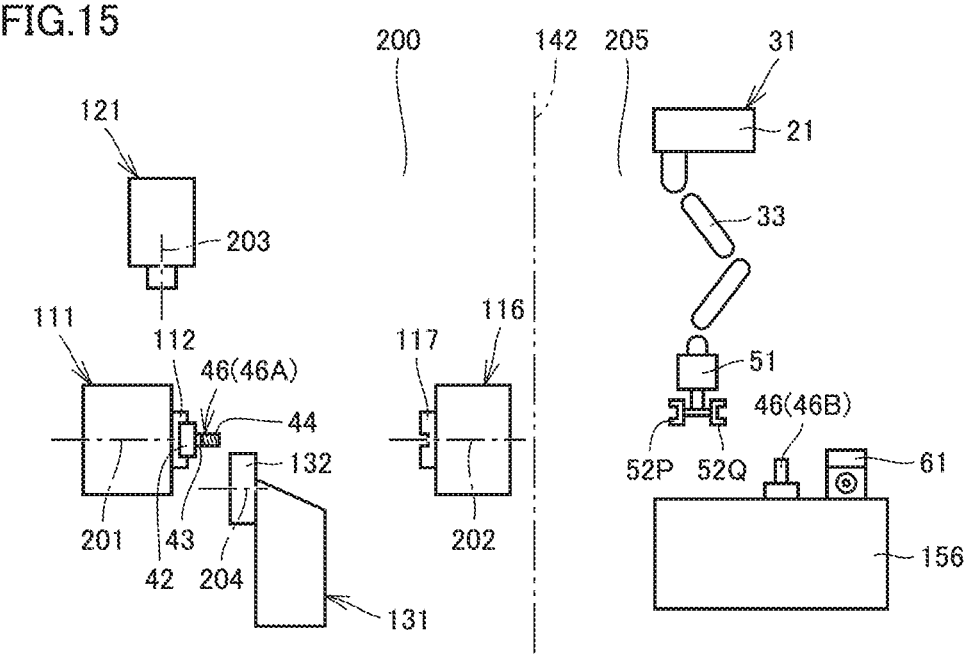

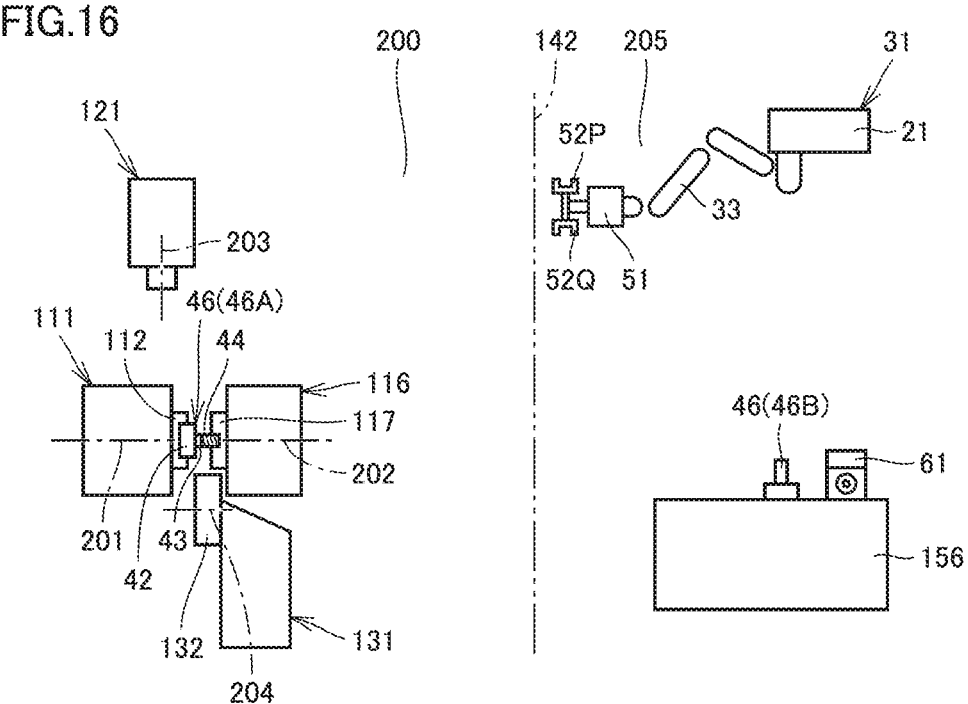
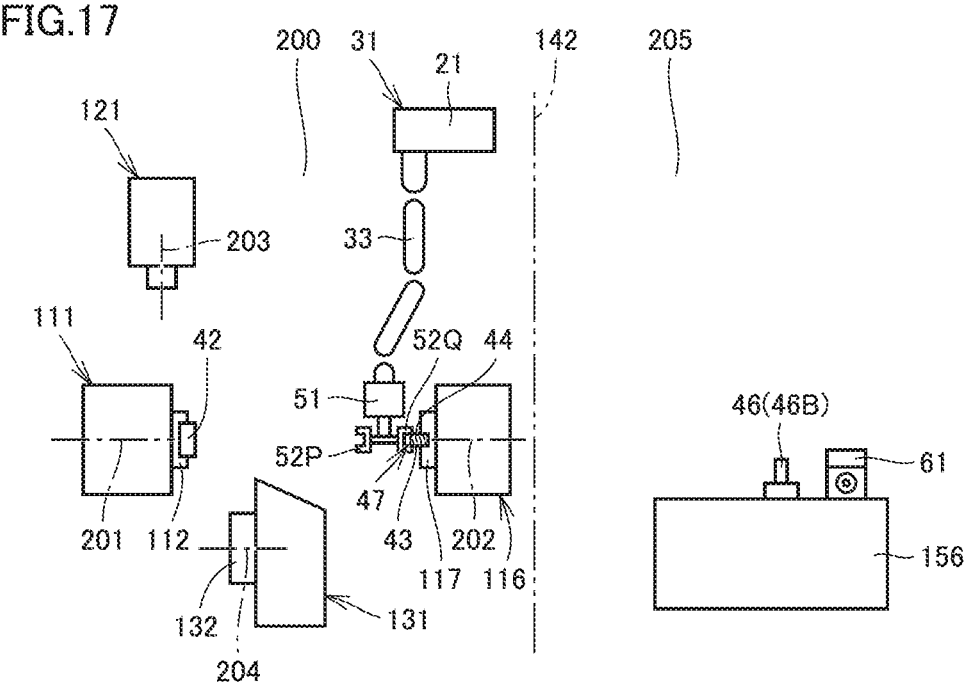

MANUFACTURING MACHINE

TECHNICAL FIELD

The present invention generally relates to manufacturing machines, and more particularly to a manufacturing machine capable of subtractive manufacturing and additive manufacturing for a workpiece.

BACKGROUND ART

Regarding conventional manufacturing machines, Japanese Patent Laying-Open No. 2004-314168 for example discloses a laser cladding apparatus for pump devices with the purpose of fast and accurate cladding without causing cracks in a base material (Patent Document 1). The laser cladding apparatus disclosed in Patent Document 1 includes a powder feeder feeding a metal material (powder) by means of argon gas as a carrier gas, a vortex-type powder feed nozzle uniformly mixing the fed metal material with the argon gas and simultaneously using a gas mixture of argon and nitrogen as a shield gas, and a multi-axis robot moving the vortex-type power feed nozzle.

Japanese Patent Laying-Open No. 2012-206137 discloses a repair apparatus with the purpose of easily performing cladding welding without human labor (Patent Document 2). The repair apparatus disclosed in Patent Document 2 includes a material feeding unit, a laser apparatus emitting a laser spot beam, and a welding robot having a multi-joint arm for moving the laser spot beam in three-dimensional directions.

CITATION LIST

Patent Document

PTD 1: Japanese Patent Laying-Open No. 2004-314168
PTD 2: Japanese Patent Laying-Open No. 2012-206137

SUMMARY OF INVENTION

Technical Problem

Additive manufacturing is a process of creating a three-dimensional shape by depositing materials onto a workpiece. In contrast, subtractive manufacturing is a process of creating a three-dimensional shape from a workpiece by removing materials from the workpiece. The mass of the workpiece has been increased after additive manufacturing, while the mass of the workpiece has been decreased after subtractive manufacturing. The additive and subtractive manufacturing processes are performed in combination in such a manner that takes respective advantages of these processes to produce the final shape of the workpiece.

Additive manufacturing and subtractive manufacturing, however, use separate tools, and it therefore takes a certain time to switch the process for a workpiece from/to additive manufacturing to/from subtractive manufacturing. In order to shorten the total time from the start to the end of the process for the workpiece and improve the productivity of a manufacturing machine, it is required to shorten the time taken for switching the process. It is required at the same time to implement means for improving the productivity of such a manufacturing machine in a simple and easy manner with minimum addition of new equipment.

An object of the present invention is therefore to solve the above problems and provide a manufacturing machine with the productivity improved in a simple and easy manner.

Solution to Problem

A manufacturing machine according to the present invention is capable of subtractive manufacturing and additive manufacturing for a workpiece. The manufacturing machine includes: a workpiece holder disposed in a machining area and configured to hold a workpiece; a tool holder disposed in the machining area and configured to hold a tool to be used for subtractive manufacturing for the workpiece; an additive manufacturing head configured to discharge a material during additive manufacturing for the workpiece; a workpiece gripper configured to grip the workpiece during transportation of the workpiece into and out of the machining area; and a robot arm on which the additive manufacturing head and the workpiece gripper are mountable.

Advantageous Effects of Invention

According to the present invention, a manufacturing machine improving the productivity in a simple and easy manner can be provided.

BRIEF DESCRIPTION OF DRAWINGS

FIG. 10 is a diagram schematically showing a first step of a manufacturing method in a second embodiment of the present invention.

FIG. 11 is a diagram schematically showing a second step of the manufacturing method in the second embodiment of the present invention.

FIG. 14 is a diagram schematically showing a fifth step of the manufacturing method in the second embodiment of the present invention.

FIG. 15 is a diagram schematically showing a sixth step of the manufacturing method in the second embodiment of the present invention.

FIG. 16 is a diagram schematically showing a seventh step of the manufacturing method in the second embodiment of the present invention.

FIG. 17 is a diagram schematically showing an eighth step of the manufacturing method in the second embodiment of the present invention.

DESCRIPTION OF EMBODIMENTS

Figure 1:
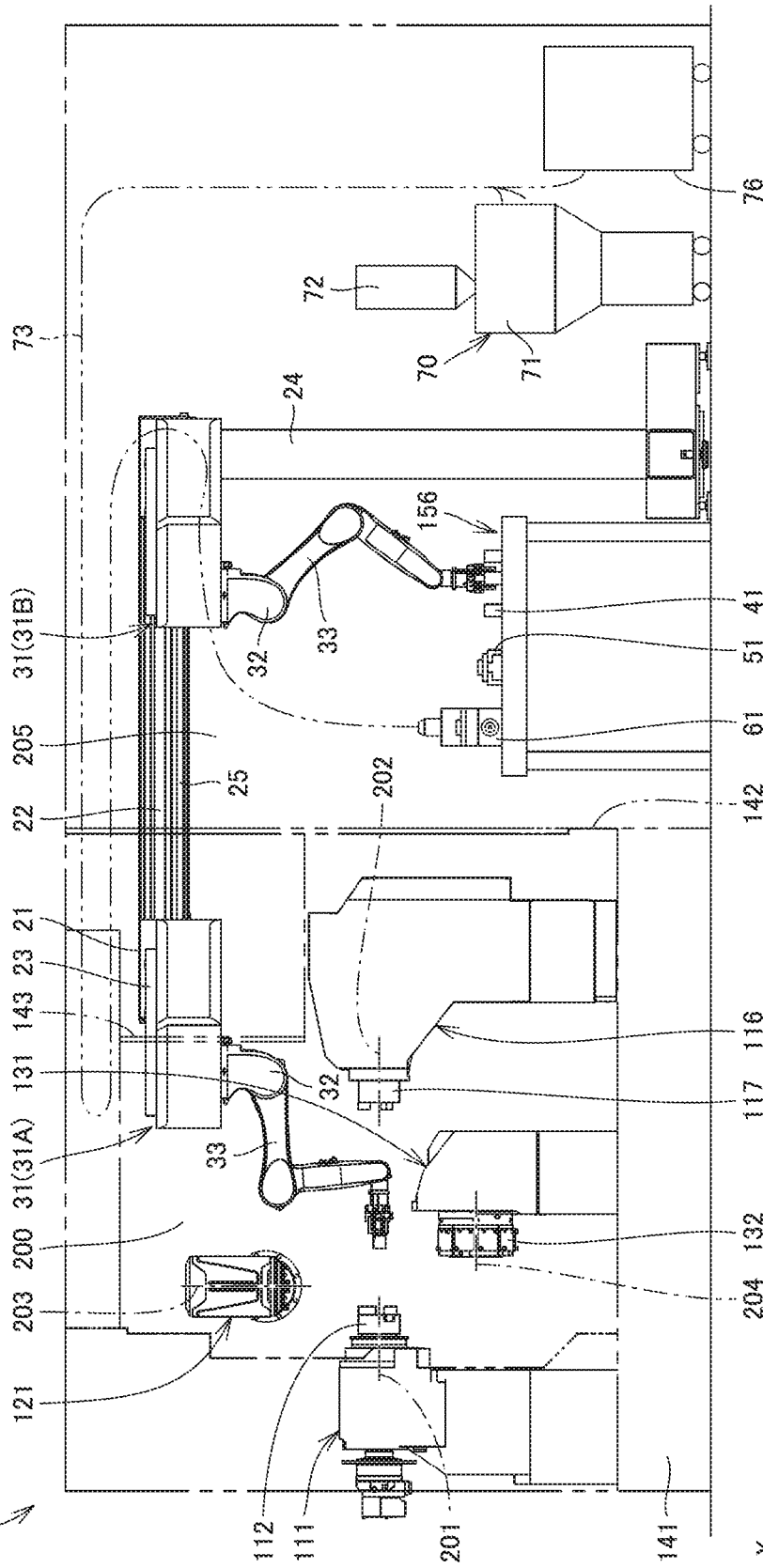
FIG. 1 is a front view showing a manufacturing machine in a first embodiment of the present invention.

Embodiments of the present invention will be described with reference to the drawings. In the drawings referenced below, the same or corresponding members are denoted by the same numerals.

First Embodiment

FIG. 1 is a front view showing a manufacturing machine in a first embodiment of the present invention. In FIG. 1, a cover body presenting the appearance of the manufacturing machine is shown as if it is transparent, so that the inside of the manufacturing machine is visible.

Referring to FIG. 1, manufacturing machine 100 is an AM/SM hybrid manufacturing machine capable of additive manufacturing (AM) for a workpiece and subtractive manufacturing (SM) for a workpiece. Manufacturing machine 100 has a turning function performed by means of a stationary tool and a milling function performed by means of a rotary tool, as functions of SM.

First, a description is given of the overall structure of manufacturing machine 100. Manufacturing machine 100 includes a bed 141, a first headstock 111, a second headstock 116, a tool spindle 121, and a lower tool rest 131.

Bed 141 is a base member for supporting first headstock 111, second headstock 116, tool spindle 121, and lower tool rest 131, and mounted on an installation surface in a factory or the like.

First headstock 111 and second headstock 116 are provided to face each other in a z-axis direction extending horizontally. First headstock 111 and second headstock 116 have a spindle 112 and a spindle 117, respectively, for rotating a workpiece in a turning process performed by means of a stationary tool. Spindle 112 is provided rotatably about a central axis 201 extending in parallel with the z axis. Spindle 117 is provided rotatably about a central axis 202 extending in parallel with the z axis. Spindle 112 and spindle 117 are each provided with a chuck mechanism for detachably holding a workpiece.

Tool spindle (upper tool rest) 121 causes a rotary tool to rotate in a milling process performed by means of the rotary tool. Tool spindle 121 is provided rotatably about a central axis 203 extending in parallel with an x axis that extends vertically. Tool spindle 121 is provided with a clamp mechanism for detachably holding the rotary tool.

Tool spindle 121 is supported above bed 141 through a column or the like (not shown). Tool spindle 121 is provided to be movable, by any of various feed mechanisms, guide mechanisms, a servo motor, and the like provided on the column or the like, in the x-axis direction, a y-axis direction extending horizontally and orthogonally to the z-axis direction, and the z-axis direction. The position of machining by the rotary tool attached to tool spindle 121 moves three-dimensionally. Further, tool spindle 121 is provided to be swivelable about a central axis extending in parallel with the y axis.

Although not shown in FIG. 1, an automatic tool-change device for automatically changing a tool attached to tool spindle 121 and a tool magazine storing replacement tools to be attached to tool spindle 121 are provided around first headstock 111.

To lower tool rest 131, a plurality of stationary tools for turning are attached. Lower tool rest 131 has a so-called turret shape, and a plurality of stationary tools are attached radially to lower tool rest 131. Lower tool rest 131 is provided for swivel indexing.

More specifically, lower tool rest 131 includes a swivel unit 132. Swivel unit 132 is provided to be swivelable about a central axis 204 extending in parallel with the z axis. At positions (10 positions in the present embodiment) located at intervals in the direction of the circumference centered at central axis 204, tool holders for holding stationary tools are attached. Swivel unit 132 swivels about central axis 204 to thereby circumferentially move the stationary tools held by the tool holders, and a stationary tool to be used for turning is indexed.

Lower tool rest 131 is supported above bed 141 through a saddle or the like (not shown). Lower tool rest 131 is provided to be movable in the x-axis direction and the z-axis direction by any of various feed mechanisms, guide mechanisms, a servo motor, and the like provided on the saddle or the like.

Manufacturing machine 100 further includes a side cover 142. Side cover 142 is disposed opposite to first headstock 111 with respect to second headstock 116. Side cover 142 separates a machining area 200 and an external area 205 from each other. In machining area 200, first headstock 111, second headstock 116, tool spindle 121, and lower tool rest 131 are arranged. Side cover 142 is equipped with an openable/closable shutter 143.

Figure 2:
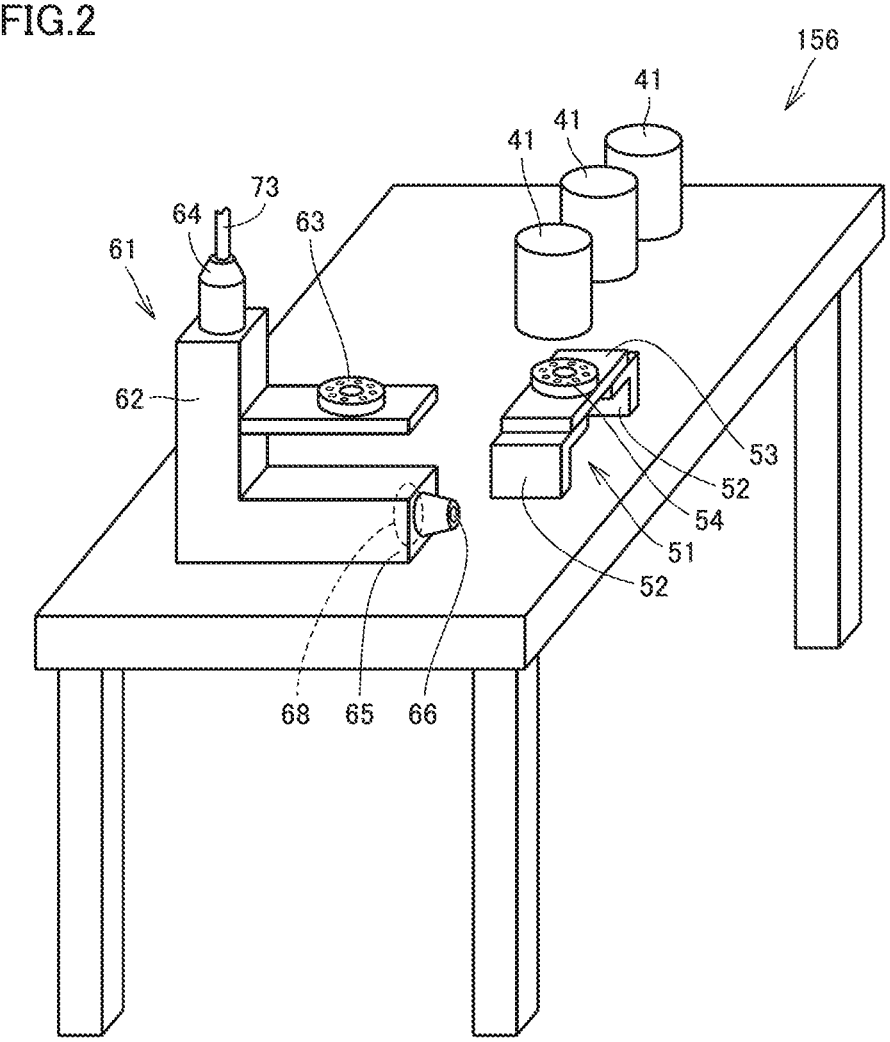
FIG. 2 is a perspective view showing workpieces, a workpiece gripper, and an additive manufacturing head that are stored at a stocker in the manufacturing machine in FIG. 1.

FIG. 2 is a perspective view showing workpieces, a workpiece gripper, and an additive manufacturing head that are stored at a stocker in the manufacturing machine in FIG. 1. Referring to FIGS. 1 and 2, manufacturing machine 100 further includes a stocker 156, a workpiece gripper 51, and an additive manufacturing head 61.

Stocker 156 is disposed in external area 205. Stocker 156 is provided in the form of a table capable of storing workpiece 41, workpiece gripper 51, and additive manufacturing head 61. Stocker 156 is not particularly limited and may be any that can store workpieces 41, workpiece gripper 51, and additive manufacturing head 61. Stocker 156 may for example be a wagon having wheels, or a shelf.

Workpiece gripper 51 grips a workpiece while the workpiece is transported between machining area 200 and external area 205. Workpiece gripper 51 shown in FIG. 2 is a single-arm type gripper capable of gripping one workpiece at a time. Additive-manufacturing head 61 performs additive manufacturing by discharging material powder toward a workpiece and emitting a laser beam toward the workpiece (directed energy deposition).

Manufacturing machine 100 further includes a robot arm 31 on which additive manufacturing head 61 and workpiece gripper 51 are mountable. In the present embodiment, additive manufacturing head 61 and workpiece gripper 51 are configured to be detachably mounted on robot arm 31.

A structure of workpiece gripper 51 is specifically described. Workpiece gripper 51 includes a pair of gripper fingers 52, a base part 53, and a coupling part 54.

Coupling part 54 is provided as a coupling mechanism to join workpiece gripper 51 with a coupling part 36 of robot arm 31 as described later herein. Coupling part 54 is mounted on base part 53. Workpiece gripper 51 is configured to be detachably mounted on robot arm 31 by coupling part 54.

On base part 53, a pair of gripper fingers 52 is mounted. The pair of gripper fingers 52 is disposed opposite to coupling part 54 with respect to base part 53. Gripper fingers 52 of the pair are disposed to face each other, and moved toward each other to grip workpiece 41. Base part 53 supports the pair of gripper fingers 52 so that the fingers are slidable toward and away from each other.

A structure of additive manufacturing head 61 is specifically described. Additive manufacturing head 61 includes a main body 62, a laser beam emission part 65, a coupling part 63, and a connecting part 64.

Coupling part 63 is provided as a coupling mechanism to join additive manufacturing head 61 with coupling part 36 of robot arm 31 as described later herein. Coupling part 63 is mounted on main body 62. Additive manufacturing head 61 (main body 62) is configured to be detachably mounted on robot arm 31 by coupling part 63.

Main body 62 has a bent shape like an L-shape. On main body 62, laser beam emission part 65 and connecting part 64 are mounted. Laser beam emission part 65 is mounted on one end of L-shaped main body 62 and connecting part 64 is mounted on the other end thereof. Main body 63 houses elements such as collimation lens and reflection mirror for directing a laser beam from connecting part 64 toward laser beam emission part 65. In laser beam emission part 65, an opening 66 is formed, and the laser beam as well as material powder are emitted through opening 66. Laser beam emission part 65 houses an optical element 68. Optical element 68 is an element (such as condenser lens and mirror) for concentrating a laser beam onto a workpiece and defining a laser-beam-irradiated region on the workpiece. Opening 66 has an opening shape that allows a laser beam directed from optical element 68 toward a workpiece to pass through.

As shown in FIG. 1, manufacturing machine 100 further includes a material powder feeder 70, a laser oscillator 76, and a tube member 73. Material powder feeder 70 and laser oscillator 76 are disposed in external area 205. Material powder feeder 70 includes a material powder tank 72 for storing material powder to be used for additive manufacturing, and a mixing unit 71 for mixing the material powder with carrier gas. Laser oscillator 76 generates a laser beam to be used for additive manufacturing. Tube member 73 houses an optical fiber for directing the laser beam from laser oscillator 76 toward additive manufacturing head 61, and a pipe for directing the material powder supplied from material powder feeder 70 toward additive manufacturing head 61.

Tube member 73 is routed from material powder feeder 70 and laser oscillator 76 to additive manufacturing head 61, and has its end connected to connecting part 64 of additive manufacturing head 61. The material powder from material powder feeder 70 and the laser beam from laser oscillator 76 are introduced through tube member 73 into additive manufacturing head 61. A tube for feeding air is routed from an air source toward robot arm 31 (not shown).

Additive manufacturing to be performed by manufacturing machine 100 is not limited to the aforementioned directed energy deposition, and may for example be material extrusion by which a molten thermoplastic resin is deposited on a workpiece to produce a three-dimensional shape, or powder bed fusion by which heat is applied to selectively fuse and harden the powder bed around a surface of the powder bed and thereby form a layer.

Figure 3:
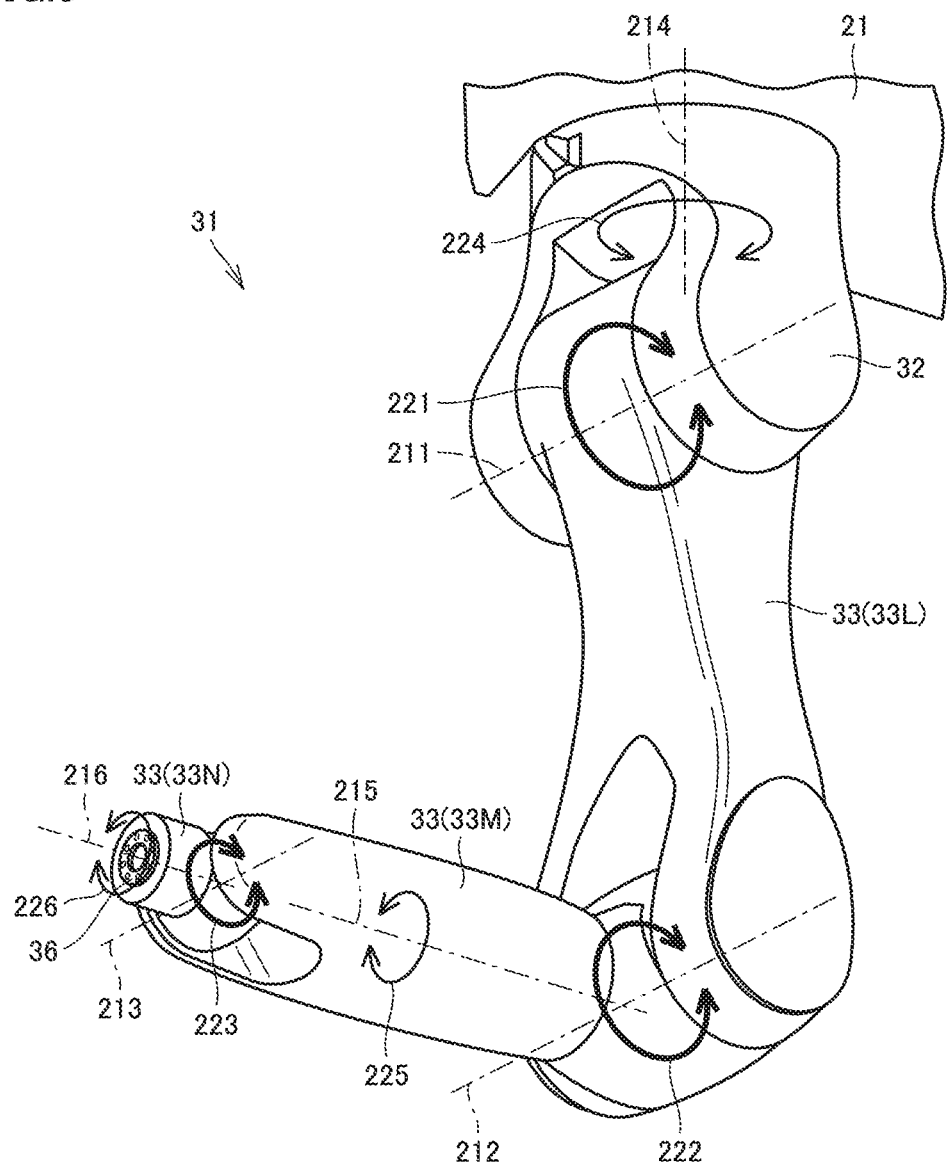
FIG. 3 is a perspective view showing a robot arm of the manufacturing machine in FIG. 1.

FIG. 3 is a perspective view showing a robot arm of the manufacturing machine in FIG. 1. Referring to FIGS. 1 to 3, a structure of robot arm 31 is specifically described. Robot arm 31 includes a movement mechanism 21, a base 32, an arm 33, and a coupling part 36.

Movement mechanism 21 is configured to be movable between machining area 200 and external area 205. Movement mechanism 21 causes robot arm 31 to move between a position 31A inside the machining area and a position 31B outside the machining area. Robot arm 31 is moved between position 31A inside the machining area and position 31B outside the machining area through opened shutter 143.

Movement mechanism 21 includes a mechanism for linearly reciprocating robot arm 31, and this mechanism includes a base member 23, a linear guide 22, a rack and pinion 25, a servo motor (not shown), and a support pillar 24.

Base member 23 is formed of a plate material on which base 32 and the servo motor are mounted. Linear guide 22 and rack and pinion 25 are positioned by support pillar 24 at a certain height from a surface on which manufacturing machine 100 is installed. Linear guide 22 is provided as a guide mechanism for guiding base member 23 in the direction parallel to the z axis. Rack and pinion 25 converts rotation output of the servo motor into linear motion to move base member 23 in the z-axis direction.

Base 32 is supported by movement mechanism 21. Base 32 has a shape protruding downward from movement mechanism 21 in the vertical direction. Arm 33 is coupled to base 32 in such a manner that allows arm 33 to be pivotable about a pivot axis 211. In FIG. 3, pivot axis 211 extends in the direction parallel to the y axis. Coupling part 36 is disposed at the leading end of arm 33.

Arm 33 is formed to extend in an arm shape from base 32 toward coupling part 36. Arm 33 has one end and the other end provided with base 32 and coupling part 36, respectively. Arm 33 is formed to extend in an arm shape in a plane orthogonal to pivot axis 211. Arm 33 swings on pivot axis 211 as a fulcrum as shown by an arrow 221 in FIG. 3. As arm 33 swings, the position of coupling part 36 is changed in a plane orthogonal to pivot axis 211.

Coupling part 36 is provided as a coupling mechanism to join robot arm 31 with coupling part 54 of workpiece gripper 51 and coupling part 63 of additive manufacturing head 61 mentioned above.

Arm 33 is made up of a first movable unit 33L, a second movable unit 33M, and a third movable unit 33N.

First movable unit 33L is coupled to base 32 so as to be pivotable about pivot axis 211 (first pivot axis). First movable unit 33L is formed to extend from base 32 in an arm shape in the direction orthogonal to pivot axis 211. First movable unit 33L swings on pivot axis 211 as a fulcrum as shown by an arrow 221 in FIG. 3.

Second movable unit 33M is coupled to first movable unit 33L so as to be pivotable about a pivot axis 212 (second pivot axis). Pivot axis 212 extends in the direction parallel to pivot axis 211. Second movable unit 33M is coupled to the end of first movable unit 33L that extends from base 32 in an arm shape. Second movable unit 33M extends from first movable unit 33L in an arm shape in the direction orthogonal to pivot axis 212. Second movable unit 33M swings on pivot axis 212 as a fulcrum as shown by an arrow 222 in FIG. 3.

Third movable unit 33N is coupled to second movable unit 33M so as to be pivotable about a pivot axis 213 (third pivot axis). Pivot axis 213 extends in the direction parallel to pivot axis 211 and pivot axis 212. Third movable unit 33N is coupled to the end of second movable unit 33M that extends from first movable unit 33L in an arm shape. Third movable unit 33N extends from second movable unit 33M in an arm shape in the direction orthogonal to pivot axis 213. Third movable unit 33N swings on pivot axis 213 as a fulcrum as shown by an arrow 223 in FIG. 3.

Base 32 is provided so as to be rotatable about a rotation axis 214 (first rotation axis) as shown by an arrow 224 in FIG. 3. Rotation axis 214 extends in the direction orthogonal to pivot axis 211. Rotation axis 214 extends in the vertical direction.

Second movable unit 33M extends in an arm shape in the axial direction of a rotation axis 215 (second rotation axis). Second movable unit 33M is provided so as to be rotatable about rotation axis 215 as shown by an arrow 225 in FIG. 3. Rotation axis 215 extends in the direction orthogonal to pivot axis 212. Third movable unit 33N extends in an arm shape in the axial direction of rotation axis 216 (third rotation axis). Third movable unit 33N is provided so as to be rotatable about rotation axis 216 as shown by an arrow 226 in FIG. 3. Rotation axis 216 extends in the direction orthogonal to pivot axis 213.

Robot arm 31 is thus configured so that six axes (pivot axes 211 to 213 and rotation axes 214 to 216) are controllable independently of one another.

While robot arm 31 described in connection with the present embodiment is a robot arm whose six axes are controllable, the robot arm may be any robot arm whose multiple axes other than six axes are controllable. Moreover, while robot arm 31 in the present embodiment has a linear motion mechanism (movement mechanism 21), the robot arm may not have such a linear motion mechanism or may be configured to have only linear motion mechanisms for multiple axes (typically three axes).

Referring to FIGS. 1 and 2, in the present embodiment, when a workpiece is transported between machining area 200 and external area 205, workpiece gripper 51 is mounted on robot arm 31. In the following, it is supposed for example that a workpiece 41 stored at stocker 156 is transported from external area 205 into machining area 200 to be mounted on first headstock 111.

First, robot arm 31 is activated to cause workpiece gripper 51 stored at stocker 156 to be mounted on robot arm 31. Robot arm 31 is activated to cause workpiece 41 stored at stocker 156 to be gripped by workpiece gripper 51.

Next, robot arm 31 is moved from external area 205 into machining area 200 to allow workpiece 41 to enter machining area 200. Robot arm 31 is activated to cause gripped workpiece 41 to approach spindle 112 of first headstock 111. After workpiece 41 is positioned at a predetermined location with respect to spindle 112, workpiece 41 is held by chucking on spindle 112. At the timing of chucking of workpiece 41, workpiece 41 is released from workpiece gripper 51. Finally, robot arm 31 is withdrawn from machining area 200 into external area 205.

In the present embodiment, additive manufacturing head 61 is mounted on robot arm 31 when additive manufacturing is performed on a workpiece. In the following, it is supposed for example that additive manufacturing is performed on workpiece 41 mounted on first headstock 111.

Figure 4:
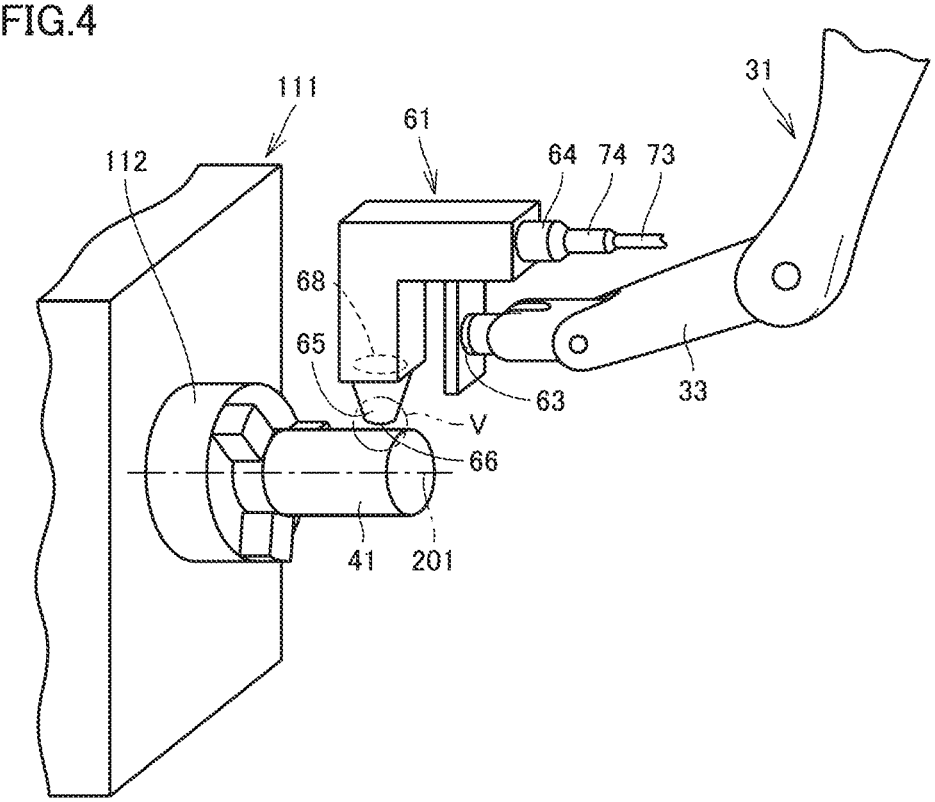
FIG. 4 is a perspective view showing the inside of a machining area during additive manufacturing in the manufacturing machine in FIG. 1.

FIG. 4 is a perspective view showing the inside of the machining area during additive manufacturing in the manufacturing machine in FIG. 1. Referring to FIGS. 1, 2, and 4, robot arm 31 is first activated to cause additive manufacturing head 61 stored at stocker 156 to be mounted on robot arm 31.

Second, robot arm 31 is moved from external area 205 into machining area 200 to allow additive manufacturing head 61 to enter machining area 200. Robot arm 31 is activated to cause additive manufacturing head 61 to approach workpiece 41 mounted on first headstock 111.

Figure 5:
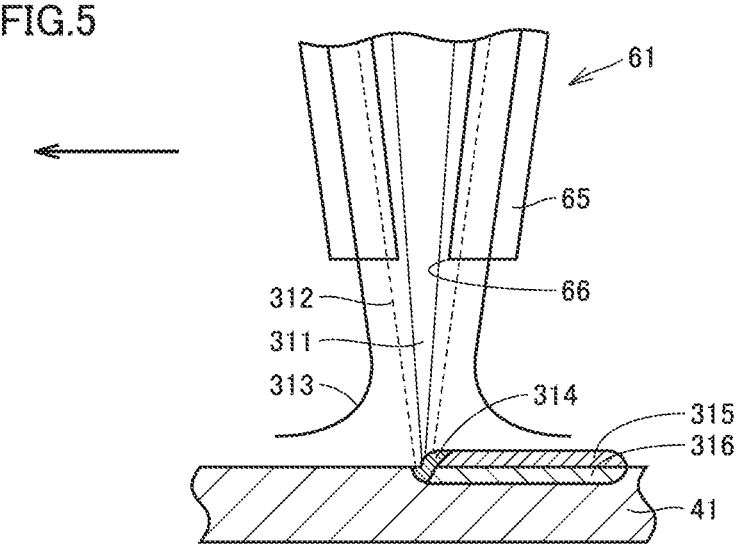
FIG. 5 is an enlarged cross-sectional view of an area enclosed by a two-dot chain line V in FIG. 4.

FIG. 5 is an enlarged cross-sectional view of an area enclosed by a two-dot chain line V in FIG. 4. Referring to FIGS. 4 and 5, operation of robot arm 31 and/or rotation of spindle 112 causes additive manufacturing head 61 to scan across workpiece 41 with opening 66 facing the surface of workpiece 41. At this time, a laser beam 311, material powder 312, and shield-and-carrier gas 313 are discharged from opening 66 of additive manufacturing head 61 toward workpiece 41. Accordingly, a melt spot 314 is formed in the surface of workpiece 41 and consequently material powder 312 is melted and deposited.

Specifically, a cladding layer 316 is formed in the surface of workpiece 41. On cladding layer 316, a cladding material 315 is deposited. Cladding material 315 is cooled into a machinable layer formed on the surface of workpiece 41. Instead of laser beam 311, an electron beam may be used. As the material powder, metal powder of aluminum alloy, magnesium alloy, or the like, or ceramic powder may be used.

After additive manufacturing is completed, robot arm 31 is withdrawn from machining area 200 into external area 205.

Referring to FIGS. 1 to 5, an AM/SM hybrid manufacturing machine capable of additive manufacturing and subtractive manufacturing for a workpiece may be implemented by means of an arrangement in which additive manufacturing head 61 is mounted on tool spindle 121 to perform additive manufacturing. Such an arrangement, however, requires additive manufacturing head 61 to be mounted on tool spindle 121 when additive manufacturing is performed and requires a rotary tool for subtractive manufacturing to be mounted on tool spindle 121 when subtractive manufacturing is performed. Accordingly, it takes a long time to switch a workpiece manufacturing process between additive manufacturing and subtractive manufacturing.

In contrast, manufacturing machine 100 in the present embodiment allows additive manufacturing head 61 to be mounted on robot arm 31 to perform additive manufacturing on a workpiece. The manufacturing machine can therefore immediately switch from additive manufacturing to subtractive manufacturing and immediately switch from subtractive manufacturing to additive manufacturing. At this time, robot arm 31 installed for transporting the workpiece is used for mounting additive manufacturing head 61, and consequently the switch time taken for switching between additive manufacturing and subtractive manufacturing can be shortened in the simple and easy manner.

While the features of robot arm 31 on which any one of additive manufacturing head 61 and workpiece gripper 51 is selectively mounted are described above in connection with the present embodiment, robot arm 31 may have a structure that allows both additive manufacturing head 61 and workpiece gripper 51 to be mounted on robot arm 31. In this case, additive manufacturing head 61 and workpiece gripper 51 may not be detachably mounted on robot arm 31.

Figure 6:
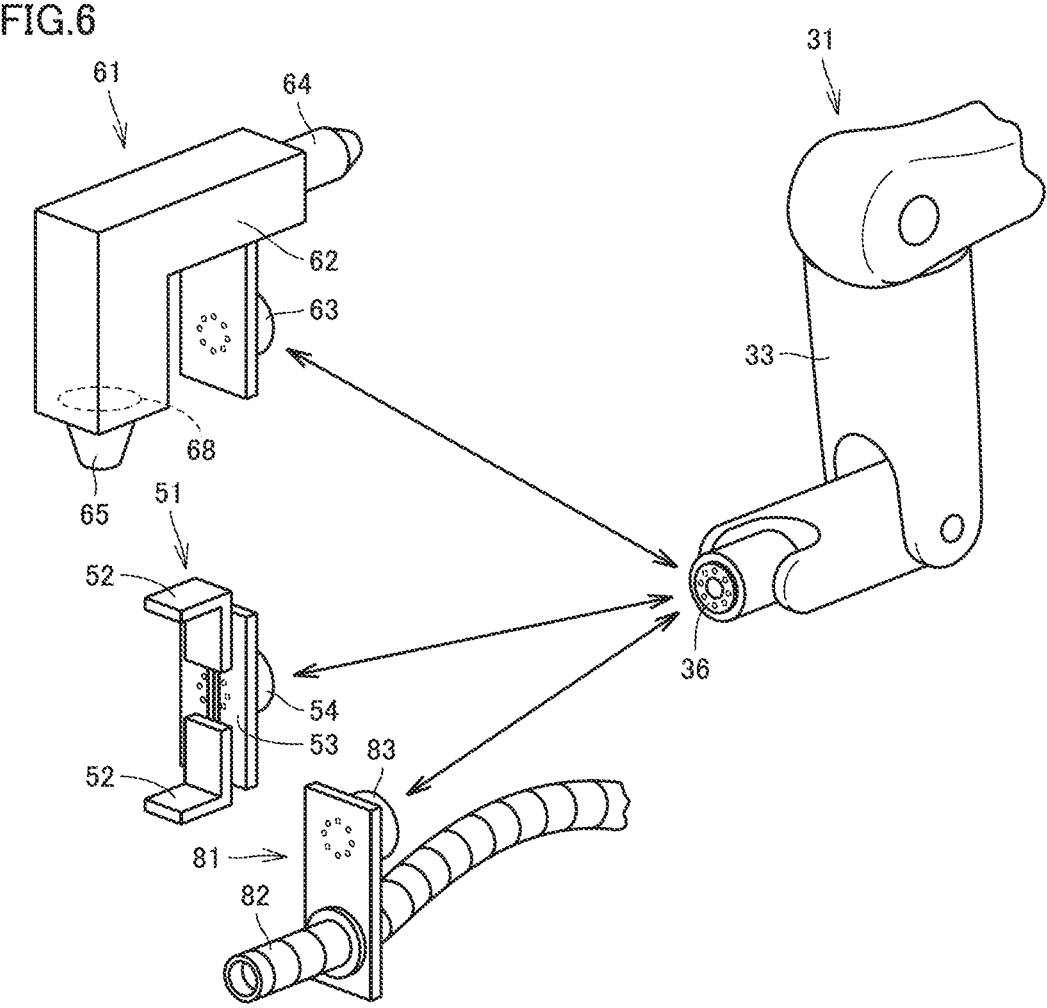
FIG. 6 is a perspective view showing a first example of deployment for use of the robot arm in FIG. 3.

FIG. 6 is a perspective view showing a first example of deployment for use of the robot arm in FIG. 3. Referring to FIG. 6, a suction nozzle 81 for collecting scrap of material powder generated in machining area 200 due to additive manufacturing may be mounted on robot arm 31.

Suction nozzle 81 includes a hose 82 and a coupling part 83. Hose 82 is connected to a negative-pressure source (not shown) for causing a negative pressure to be generated. Coupling part 83 is provided as a coupling mechanism to join suction nozzle 81 with coupling part 36 of robot arm 31.

Figure 7:
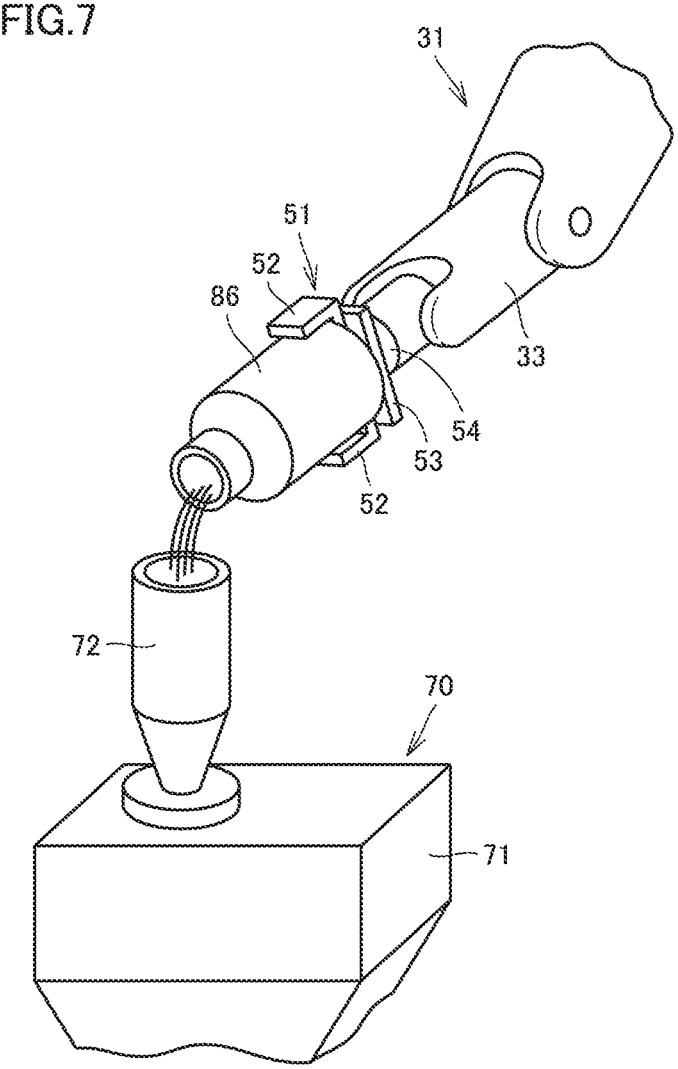
FIG. 7 is a perspective view showing a second example of deployment for use of the robot arm in FIG. 3.

FIG. 7 is a perspective view showing a second example of deployment for use of the robot arm in FIG. 3. Referring to FIG. 7, material powder tank 72 of material powder feeder 70 extends upward from mixing unit 71 and has a tubular shape with an opening at its end. Material powder tank 72 is configured to be replenished with material powder through its opening.

Workpiece gripper 51 mounted on robot arm 31 may be used to replenish material powder tank 72 with material powder. Specifically, a container 86 containing material powder is gripped by workpiece gripper 51 mounted on robot arm 31. Robot arm 31 is activated to replenish material powder tank 72 with material powder from container 86.

Figure 8:
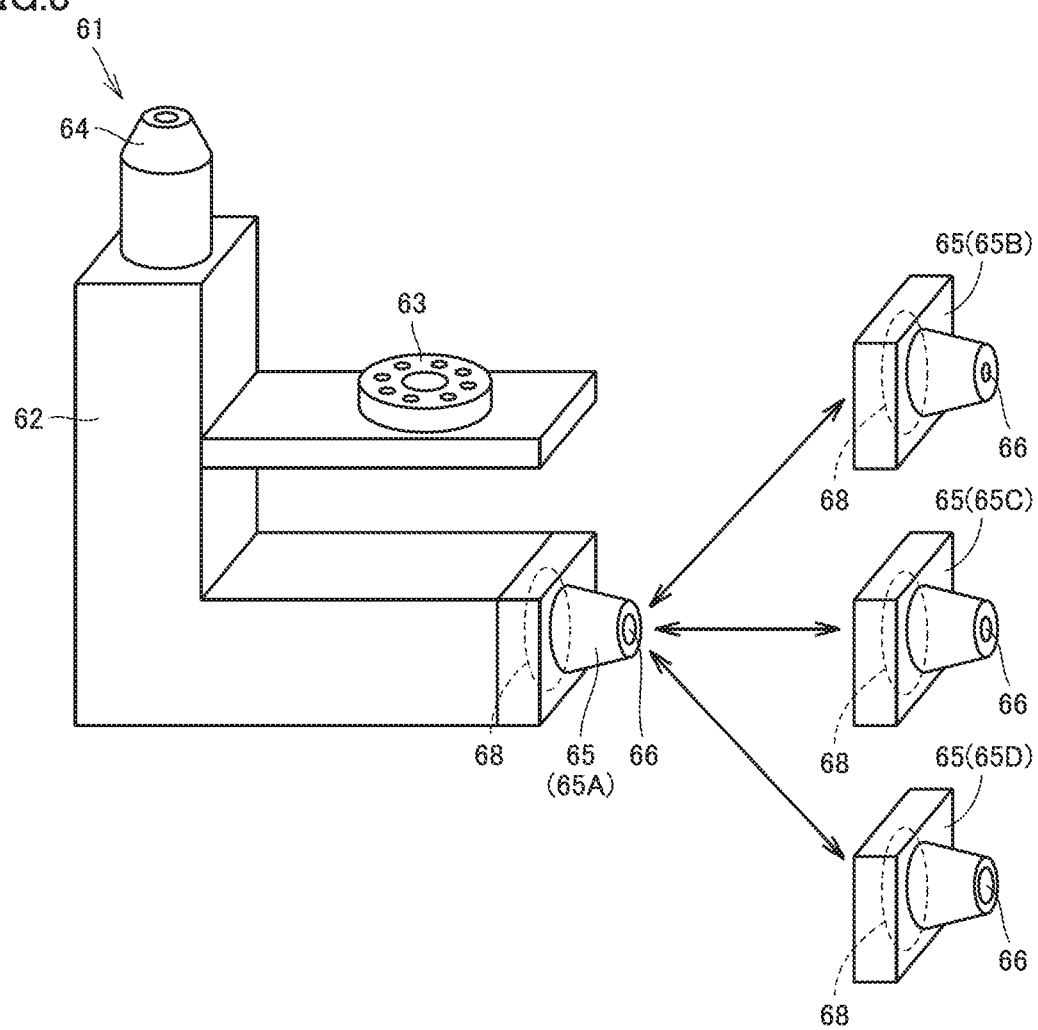
FIG. 8 is a perspective view showing a modification of the additive manufacturing head in FIG. 2.

FIG. 8 is a perspective view showing a modification of the additive manufacturing head in FIG. 2. Referring to FIG. 8, in the present modification, laser beam emission part 65 is configured to be detachably mounted on main body 62. Stocker 156 (see FIG. 1) stores a plurality of laser beam emission parts 65 (65A, 65B, 65C, 65D) containing respective optical elements 68 that are different in type from one another. Depending on the type of optical element 68, the shape of the laser-beam-irradiated region on a workpiece varies (circular shape or rectangular shape, for example), and/or the size varies (φ2 mm or φ4 mm, for example). Robot arm 31 on which additive manufacturing head 61 is mounted is activated to mount, on main body 62, a laser beam emission part 65 containing an optical element 68 suitable for additive manufacturing to be performed.

The above-described structure of manufacturing machine 100 in the first embodiment of the present invention is now summarized. Manufacturing machine 100 in the present embodiment is capable of subtractive manufacturing and additive manufacturing for a workpiece. Manufacturing machine 100 includes: first headstock 111 and second headstock 116 disposed in machining area 200 for serving as a workpiece holder holding a workpiece; tool spindle 121 and lower tool rest 131 disposed in machining area 200 for serving as a tool holder holding a tool to be used for subtractive manufacturing for a workpiece; additive manufacturing head 61 for discharging material when additive manufacturing is performed on a workpiece; workpiece gripper 51 for gripping a workpiece when the workpiece is transported into or out of machining area 200; and robot arm 31 on which additive manufacturing head 61 and workpiece gripper 51 are mountable.

Manufacturing machine 100 configured in this way in the first embodiment of the present embodiment enables shortening of the time taken for the manufacturing process for a workpiece to switch between additive manufacturing and subtractive manufacturing as well as improvement of the productivity in the simple and easy manner.

While the above description is of the AM/SM hybrid manufacturing machine configured on the basis of a multifunctional manufacturing machine having both a turning function and a milling function, the configuration is not limited to this. Specifically, an AM/SM hybrid manufacturing machine may be configured based on a lathe having a turning function or a machining center having a milling function. When the AM/SM hybrid manufacturing machine is configured based on the machining center, a table is used as a workpiece holder for holding a workpiece within a machining area.

Second Embodiment

In connection with the present embodiment, a description is given of an example of a manufacturing method for performing additive manufacturing and subtractive manufacturing on a workpiece using manufacturing machine 100 in the first embodiment.

Figure 9:
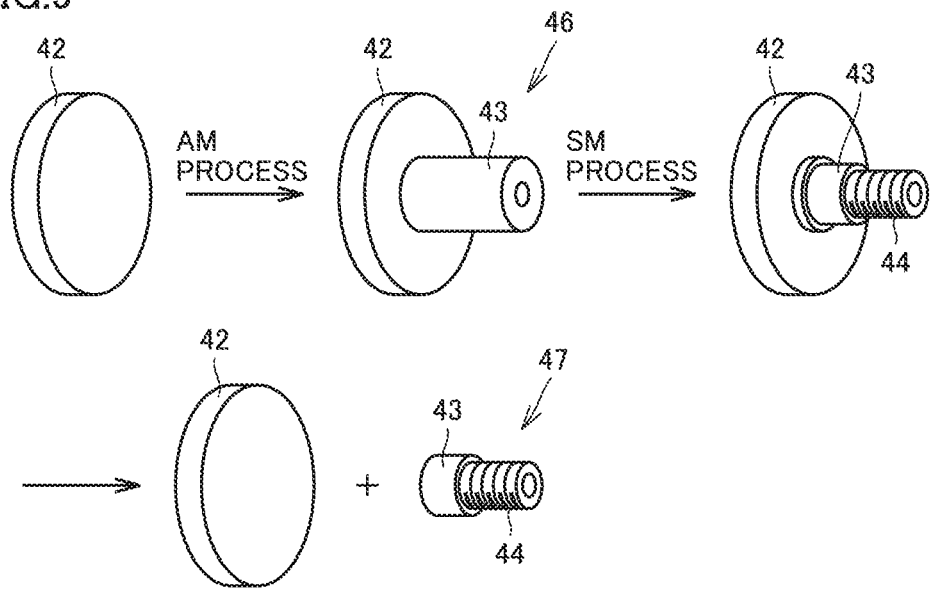
FIG. 9 is a diagram showing a shape of a workpiece changed through additive manufacturing and subtractive manufacturing.

FIG. 9 is a diagram showing a shape of a workpiece changed through additive manufacturing and subtractive manufacturing. Referring to FIG. 9, a base material 42 is prepared first. Base material 42 has a disc shape. Next, additive manufacturing is performed to produce an intermediate product 46 made up of base material 42 and a cladding portion 43 formed on an end face of base material 42. Cladding portion 43 has a cylindrical shape. Next, subtractive manufacturing is performed to form a threaded portion 44 on the outer peripheral surface of cladding portion 43. Finally, base material 42 is separated from cladding portion 43 to produce a final product 47 including threaded portion 44 formed thereon.

FIGS. 10 to 18 are diagrams each schematically showing a step of the manufacturing method in the second embodiment of the present invention.

Referring to FIG. 10, in machining area 200, base material 42 is mounted on first headstock 111. In external area 205, stocker 156 stores an intermediate product 46A prepared in a preceding step, a workpiece gripper 51, and an additive manufacturing head 61. In the present embodiment, workpiece gripper 51 is a double-arm type gripper capable of gripping two workpieces simultaneously, and includes a pair of gripper fingers 52P and a pair of gripper fingers 52Q.

First, robot arm 31 is activated to cause additive manufacturing head 61 stored at stocker 156 to be mounted on robot arm 31.

Referring to FIG. 11, robot arm 31 is then moved from external area 205 into machining area 200. Robot arm 31 is activated to cause additive manufacturing head 61 to approach base material 42 mounted on first headstock 111. By means of additive manufacturing head 61, cladding portion 43 is formed on an end face of base material 42. Accordingly, an intermediate product 46B is produced.

Figure 12:
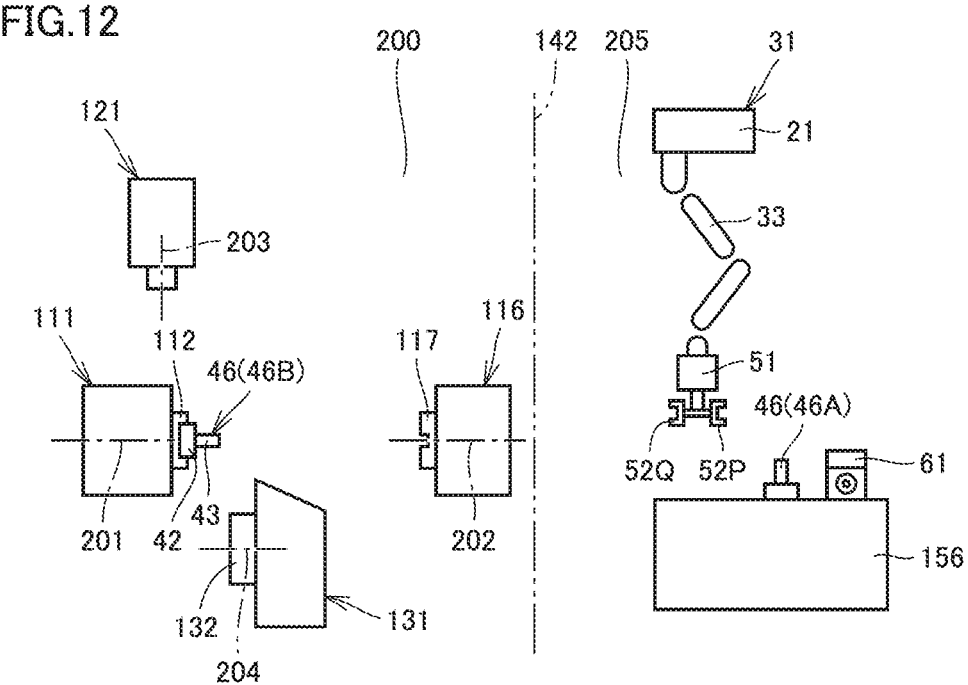
FIG. 12 is a diagram schematically showing a third step of the manufacturing method in the second embodiment of the present invention.

Referring to FIG. 12, robot arm 31 is then moved from machining area 200 into external area 205. Robot arm 31 is activated to store additive manufacturing head 61 at stocker 156 and cause workpiece gripper 51 stored at stocker 156 to be mounted on robot arm 31, instead of additive manufacturing head 61.

Figure 13:
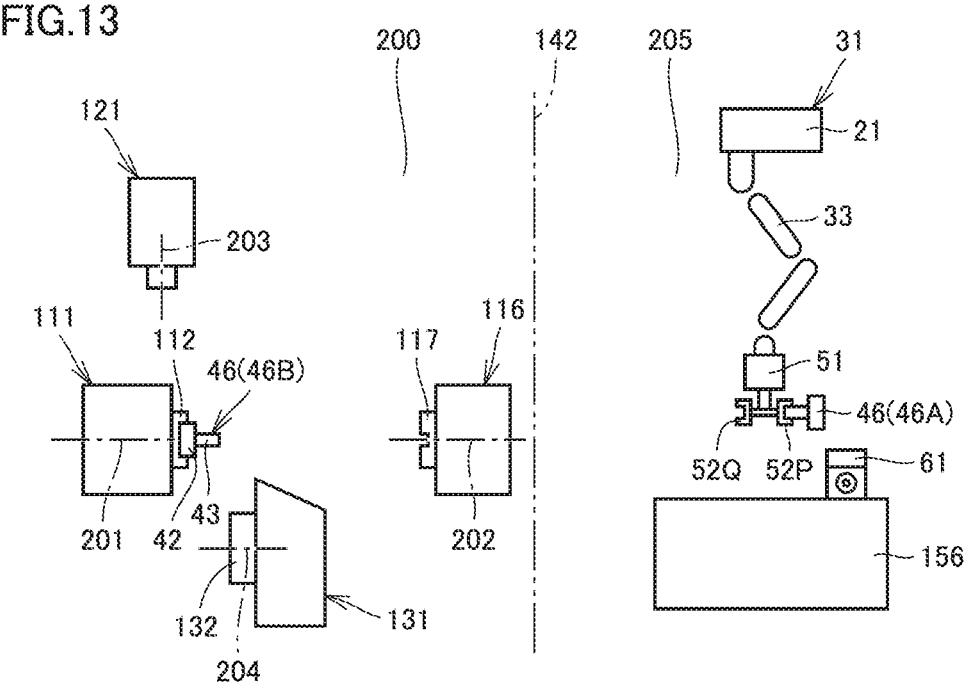
FIG. 13 is a diagram schematically showing a fourth step of the manufacturing method in the second embodiment of the present invention.

Referring to FIG. 13, robot arm 31 is then activated to cause intermediate product 46A to be gripped by gripper fingers 52P of workpiece gripper 51.

Referring to FIG. 14, robot arm 31 is then moved from external area 205 into machining area 200. Robot arm 31 is activated to cause workpiece gripper 51 to approach intermediate product 46B mounted on first headstock 111 and cause intermediate product 46B to be gripped by gripper fingers 52Q of workpiece gripper 51. Gripper fingers 52P and gripper fingers 52Q are turned to change the workpiece mounted on first headstock 111 from intermediate product 46B to intermediate product 46A.

Referring to FIG. 15, robot arm 31 is then moved from machining area 200 into external area 205. Robot arm 31 is activated to cause intermediate product 46B to be stored at stocker 156. Intermediate product 46B increased in temperature by the additive manufacturing described above with reference to FIG. 11 is cooled at stocker 156 until the next step of changing the workpiece as described above with reference to FIG. 14. Robot arm 31 is kept on standby at a position (the position shown in FIG. 16) before shutter 143.

In machining area 200, after robot arm 31 is withdrawn into external area 205 and shutter 143 is closed, subtractive manufacturing for forming threaded portion 44 in cladding portion 43 of intermediate product 46A is started. In the present embodiment, additive manufacturing head 61 is mounted on robot arm 31 to perform additive manufacturing on the workpiece. It is therefore possible to keep lower tool rest 131 or tool spindle 121 on standby with a subtractive manufacturing tool mounted on lower tool rest 131 or tool spindle 121, and thereby shorten the time taken to switch from additive manufacturing to subtractive manufacturing.

Referring to FIG. 16, first headstock 111 and second headstock 116 are caused to approach each other while respective rotations of spindle 112 and spindle 117 are synchronized with each other. An end of cladding portion 43 of intermediate product 46A is held by chucking on spindle 117. With the opposite ends of intermediate product 46A held by first headstock 111 and second headstock 116, subtractive manufacturing (cut-off machining) is performed for separating base material 42 from cladding portion 43. Accordingly, base material 42 is left on first headstock 111 and a final product 47 is left on second headstock 116.

During subtractive manufacturing, machining area 200 is in an atmosphere of cutting oil. In the present embodiment, additive manufacturing head 61 is placed in external area 205 during subtractive manufacturing, and therefore, additive manufacturing head 61 having optical elements can be prevented from being exposed to the cutting oil. Even if control of robot arm 31 on which additive manufacturing head 61 is mounted malfunctions, the malfunction can be prevented from influencing machining area 200.

Referring to FIG. 17, robot arm 31 is then moved from external area 205 into machining area 200. Robot arm 31 is activated to cause workpiece gripper 51 to approach final product 47 mounted on second headstock 116 and cause final product 47 to be gripped by workpiece gripper 51.

Figure 18:
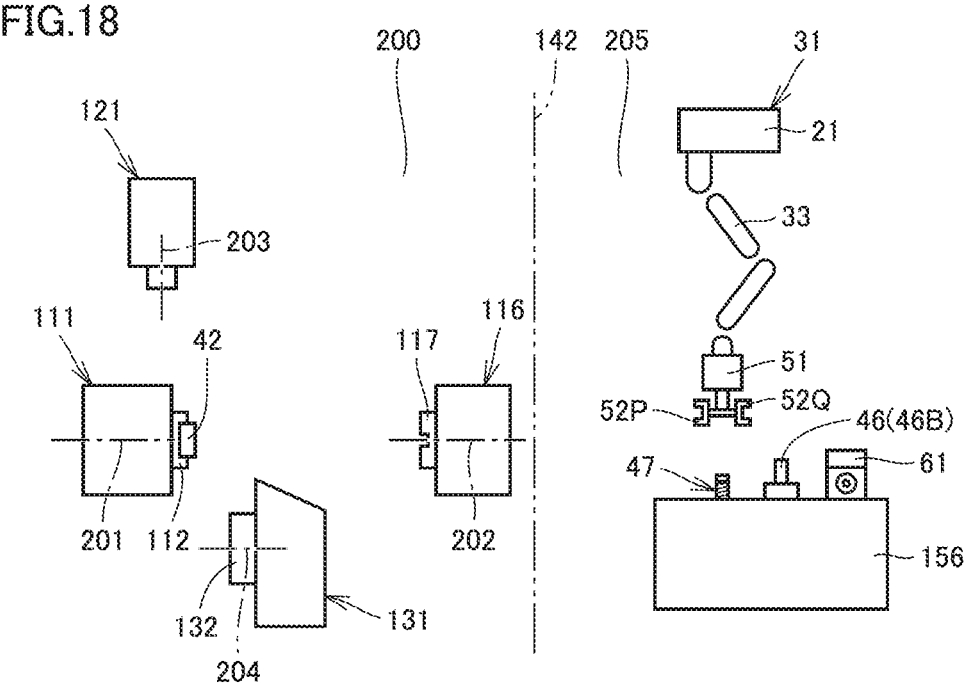
FIG. 18 is a diagram schematically showing a ninth step of the manufacturing method in the second embodiment of the present invention.

Referring to FIG. 18, robot arm 31 is then moved from machining area 200 into external area 205. Robot arm 31 is activated to store final product 47 at stocker 156. Robot arm 31 is activated to cause workpiece gripper 51 to be stored at stocker 156. Accordingly, the process returns to the step described above with reference to FIG. 10.

Manufacturing machine 100 and the manufacturing method in the second embodiment of the present invention that have the characteristics as described above can also produce the effects described above in connection with the first embodiment.

A manufacturing machine according to the present invention is capable of subtractive manufacturing and additive manufacturing for a workpiece. The manufacturing machine includes: a workpiece holder disposed in a machining area and configured to hold a workpiece; a tool holder disposed in the machining area and configured to hold a tool to be used for subtractive manufacturing for the workpiece; an additive manufacturing head configured to discharge a material during additive manufacturing for the workpiece; a workpiece gripper configured to grip the workpiece during transportation of the workpiece into and out of the machining area; and a robot arm on which the additive manufacturing head and the workpiece gripper are mountable.

Regarding the manufacturing machine configured in this manner, the additive manufacturing head discharging a material during additive manufacturing for a workpiece as well as the workpiece gripper gripping the workpiece during transportation of the workpiece into and out of the machining area are mountable on the robot arm. This robot arm is provided to enable improvement of the productivity of the manufacturing machine in the simple and easy manner.

Preferably, the additive manufacturing head and the workpiece gripper are configured to be detachably mounted on the robot arm. The additive manufacturing head is configured to be mounted on the robot arm during additive manufacturing for the workpiece. The workpiece gripper is configured to be mounted on the robot arm during transportation of the workpiece into and out of the machining area.

Regarding the manufacturing machine configured in this manner, one of the additive manufacturing head and the workpiece gripper is mounted on the robot arm depending on whether a workpiece is to be transported or additive manufacturing is to be performed, which enables the size of the robot arm to be reduced.

Preferably, the manufacturing machine further includes a stocker disposed outside the machining area and capable of storing the additive manufacturing head.

The manufacturing machine configured in this manner enables the additive manufacturing head to be withdrawn from the machining area when subtractive manufacturing is to be performed.

Preferably, the additive manufacturing head is configured to perform additive manufacturing by discharging material powder toward the workpiece and emitting a laser beam toward the workpiece. The additive manufacturing head includes: a main body configured to be mounted on the robot arm; and a laser beam emission part configured to be detachably mounted on the main body to emit a laser beam and define a laser-beam-irradiated region on the workpiece. The stocker is configured to store a plurality of the laser beam emission parts different from one another in the laser-beam-irradiated region to be defined.

The manufacturing machine configured in this manner enables a suitable laser beam emission part to be mounted on the robot arm depending on the type of additive manufacturing to be performed on a workpiece.

Preferably, the manufacturing machine further includes a suction nozzle configured to be connected to a negative-pressure source configured to cause a negative pressure to be generated, the suction nozzle being mountable on the robot arm.

The manufacturing machine configured in this manner enables material scrap and the like generated in the machining area to be sucked during additive manufacturing by activating the robot arm on which the suction nozzle is mounted.

Preferably, the robot arm includes: a movement mechanism configured to be movable into and out of the machining area; a base supported by the movement mechanism; and an arm pivotably coupled to the base, the additive manufacturing head and the workpiece gripper being mountable on the arm.

The manufacturing machine configured in this manner enables improvement of the degree of freedom in causing the additive manufacturing head to approach a workpiece during additive manufacturing.

Preferably, the workpiece holder is a headstock configured to rotate the workpiece, or a table on which the workpiece is to be fixed.

The manufacturing machine configured in this manner enables a workpiece to be transported between the headstock or table in the machining area and the outside of the machining area by means of the workpiece gripper mounted on the robot arm.

Preferably, the tool holder is a tool rest on which a tool is to be fixed, or a tool spindle configured to rotate a tool.

Regarding the manufacturing machine configured in this manner, the manufacturing machine including the tool rest or tool spindle enables any of the above-described effects to be produced.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The present invention is mainly applied to AM/SM hybrid manufacturing machines capable of subtractive manufacturing and additive manufacturing for a workpiece.

REFERENCE SIGNS LIST 21 movement mechanism; 22 linear guide; 23 base member; 24 support pillar; 25 rack and pinion; 31 robot arm; 31A position inside machining area; 31B position outside machining area; 32 base; 33 arm; 33L first movable unit; 33M second movable unit; 33N third movable unit; 36, 54, 63, 83 coupling part; 41 workpiece; 42 base material; 43 cladding portion; 44 threaded portion; 46, 46A, 46B intermediate product; 47 final product; 51 workpiece gripper; 52, 52P, 52Q gripper finger; 53 base part; 61 additive manufacturing head; 62 main body; 64 connecting part; 65 laser beam emission part; 66 opening; 68 optical element; 70 material powder feeder; 71 mixing unit; 72 material powder tank; 73 tube member; 76 laser oscillator; 81 suction nozzle; 82 hose; 86 container; 100 manufacturing machine; 111 first headstock; 112, 117 spindle; 116 second headstock; 121 tool spindle; 131 lower tool rest; 132 swivel unit; 141 bed; 142 side cover; 143 shutter; 156 stocker; 200 machining area; 201, 202, 203, 204 central axis; 205 external area; 211, 212, 213 pivot axis; 214, 215, 216 rotation axis; 311 laser beam; 312 material powder; 313 gas; 314 melt spot; 315 cladding material; 316 cladding layer

The invention claimed is:

1. A manufacturing machine capable of subtractive manufacturing and additive manufacturing for a workpiece, the manufacturing machine comprising:
   a cover body forming a machining area and an external area of the machining area;
   a workpiece holder disposed in the machining area and configured to hold a workpiece;
   a tool holder disposed in the machining area and configured to hold a subtractive manufacturing tool to be used for subtractive manufacturing for the workpiece;
   an additive manufacturing head configured to discharge a material during additive manufacturing for the workpiece;
   a workpiece gripper configured to grip the workpiece during transportation of the workpiece between the machining area and the external area; and
   a robot arm on which the additive manufacturing head and the workpiece gripper are mountable, wherein
   the additive manufacturing head and the workpiece gripper are configured to be detachably mounted on the robot arm,
   the additive manufacturing head is mounted on the robot arm and is disposed in the machining area during additive manufacturing for the workpiece while the subtractive manufacturing tool is held by the tool holder disposed in the machining area,
   the workpiece gripper is mounted on the robot arm during transportation of the workpiece between the machining area and the external area while the subtractive manufacturing tool is held by the tool holder disposed in the machining area, and
   the robot arm and the additive manufacturing head are disposed in the external area during subtractive manufacturing for the workpiece using the subtractive manufacturing tool held in the tool holder.

2. The manufacturing machine according to claim 1, further comprising a stocker disposed outside the machining area and capable of storing the additive manufacturing head.

3. The manufacturing machine according to claim 2, wherein
   the additive manufacturing head is configured to perform additive manufacturing by discharging material powder toward the workpiece and emitting a laser beam toward the workpiece,
   the additive manufacturing head includes:
      a main body configured to be mounted on the robot arm; and
      a laser beam emission part configured to be detachably mounted on the main body to emit a laser beam and define a laser-beam-irradiated region on the workpiece, and
   the stocker is configured to store a plurality of the laser beam emission parts different from one another in the way the laser beam emission parts affect the laser-beam-irradiated region to be defined.

4. The manufacturing machine according to claim 1, further comprising a suction nozzle configured to be connected to a negative-pressure source configured to cause a negative pressure to be generated, the suction nozzle being mountable on the robot arm.

5. The manufacturing machine according to claim 1, wherein
   the robot arm includes:
      a movement mechanism configured to be movable between the machining area and the external area;
      a base supported by the movement mechanism; and
      an arm pivotably coupled to the base, the additive manufacturing head and the workpiece gripper being mountable on the arm.

6. The manufacturing machine according to claim 1, wherein
   the workpiece holder is a headstock configured to rotate the workpiece, or a table on which the workpiece is to be fixed.

7. The manufacturing machine according to claim 1, wherein
   the tool holder is a tool rest on which a tool is to be fixed, or a tool spindle configured to rotate a tool.

8. The manufacturing machine according to claim 1, wherein only one of additive manufacturing head and workpiece gripper is selectively mounted on the robot arm at a time.

9. The manufacturing machine according to claim 1, wherein both of said additive manufacturing head and workpiece gripper are mounted on said robot arm.

10. The manufacturing machine according to claim 1, wherein the robot arm includes a movement mechanism which linearly reciprocates the robot arm between a first position in the machining area and a second position in the external area, the movement mechanism including a linear guide and a base member which moves along the linear guide, the linear guide being disposed above the workpiece holder.

\* \* \* \* \*